United States Patent
Gudbjartsson et al.

(10) Patent No.: US 7,404,079 B2
(45) Date of Patent: Jul. 22, 2008

(54) AUTOMATIC IDENTITY PROTECTION SYSTEM WITH REMOTE THIRD PARTY MONITORING

(75) Inventors: Hakon Gudbjartsson, Reykjavik (IS); Sverrir Karlsson, Kopavogur (IS); Skeggi Thormar, Reykjavik (IS)

(73) Assignee: deCODE genetics, ehf (IS)

( * ) Notice: Subject to any disclaimer, the term of this patent is extended or adjusted under 35 U.S.C. 154(b) by 909 days.

(21) Appl. No.: 09/808,720

(22) Filed: Mar. 15, 2001

(65) Prior Publication Data

US 2001/0027519 A1 Oct. 4, 2001

Related U.S. Application Data

(60) Provisional application No. 60/190,262, filed on Mar. 17, 2000.

(51) Int. Cl.
*H04L 9/00* (2006.01)
(52) U.S. Cl. .......... 713/168; 713/155; 713/169; 713/171; 380/277; 380/278; 380/283; 705/50; 705/74
(58) Field of Classification Search ............ 380/30, 380/277, 278, 283; 705/50, 74; 713/155, 713/168, 169, 170, 171
See application file for complete search history.

(56) References Cited

U.S. PATENT DOCUMENTS

| | | | | |
|---|---|---|---|---|
| 3,962,539 A | 6/1976 | Ehrsam et al. | ......... | 178/22 |
| 4,405,829 A | 9/1983 | Rivest et al. | ......... | 178/22.1 |
| 5,638,445 A * | 6/1997 | Spelman et al. | ......... | 705/77 |
| 5,825,890 A | 10/1998 | Elgamal et al. | ......... | 380/49 |
| 5,903,652 A * | 5/1999 | Mital | ......... | 705/78 |
| 5,907,677 A | 5/1999 | Glenn et al. | ......... | 395/200.36 |
| 5,923,842 A | 7/1999 | Pedersen et al. | ......... | 395/188.01 |
| 6,023,510 A | 2/2000 | Epstein | ......... | 380/25 |
| 6,081,793 A * | 6/2000 | Challener et al. | ......... | 705/50 |
| 6,151,631 A * | 11/2000 | Ansell et al. | ......... | 709/229 |
| 6,675,147 B1 * | 1/2004 | Woestemeyer et al. | ...... | 704/275 |

FOREIGN PATENT DOCUMENTS

EP 909074 A1 * 4/1999

OTHER PUBLICATIONS

Schneier, Applied Cryptography, John wiley & Sons, 2nd Edition, pp. 38-39, 54-57, and 112-114.*
Shamir, How to Share a Secret, 1979, ACM, vol. 22, pp. 612-613.*
Schneier, B., *Applied Cryptography* 2nd Ed., John Wiley & Sons, 1996 (pp. 1, 193, 435, 483, 528).
Castano, S. et al., *Database Security*, Addison-Welsey Publishing Company, 1995 (pp. 218-219).

(Continued)

*Primary Examiner*—Kimyen Vu
*Assistant Examiner*—Beemnet W Dada
(74) *Attorney, Agent, or Firm*—Hamilton Brook Smith & Reynolds, PC

(57) ABSTRACT

This invention provides an automated system for the processing of data packets, composed of personal identifiers and personal data, such that the personally identifiable data sent by one party may be considered anonymous once received by a second party. The invention uses secret sharing techniques to facilitate distributed key management of the mapping functions and strong authentication to allow the system to be operated remotely.

36 Claims, 5 Drawing Sheets

OTHER PUBLICATIONS

Ramakrishnan, R. and J. Gehrke, *Database Management Systems*, McGraw Hill, 2000 (p. 119).

Garfinkle, S. and G. Spafford, *Practical UNIX and Internet Security*, 2nd Ed., O'Reilly & Associates, Inc., 1996 (p. 638).

* cited by examiner

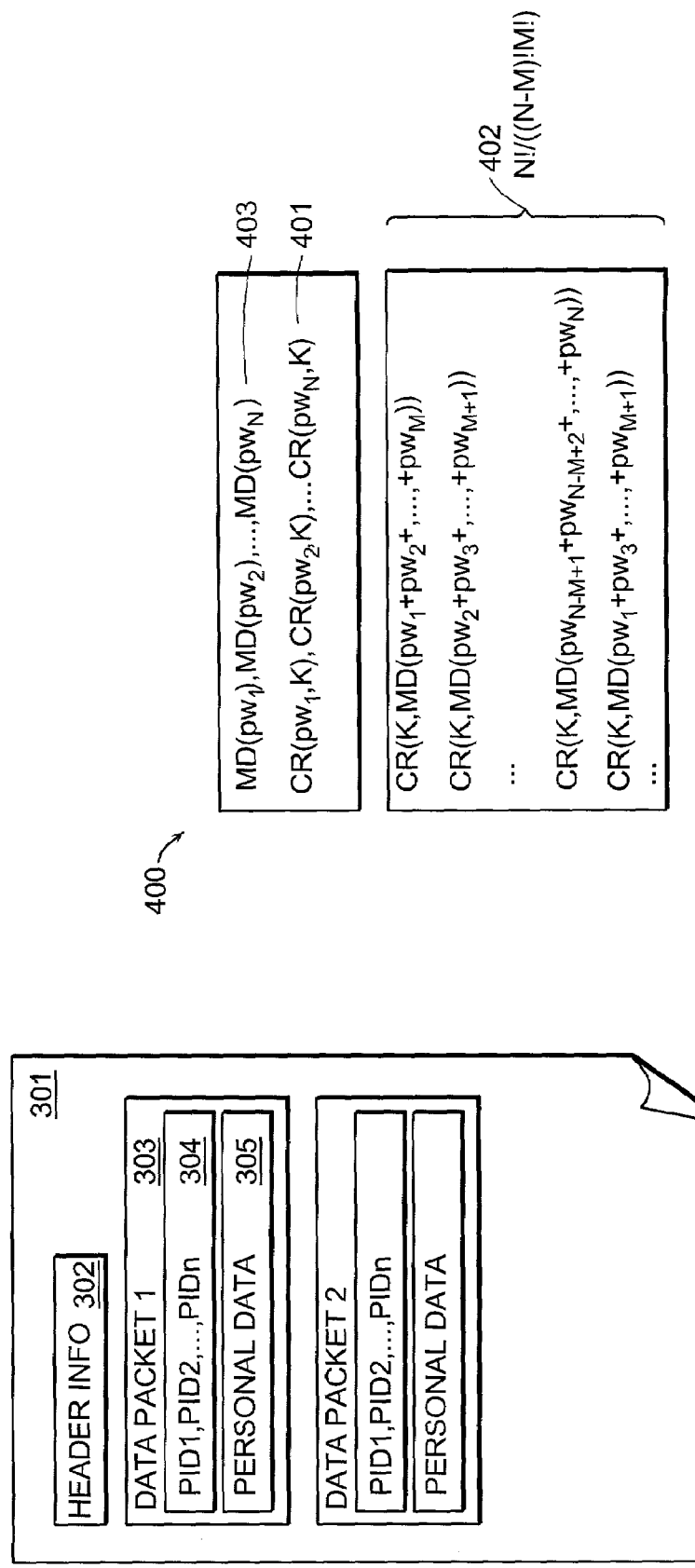

AUTOMATIC IDENTITY PROTECTION SYSTEM WITH REMOTE THIRD PARTY MONITORING

RELATED APPLICATION

This application claims the benefit of U.S. Provisional Application No. 60/190,262 filed Mar. 17, 2000, the entire teachings of which are incorporated herein by reference.

BACKGROUND OF THE INVENTION

1. Field of the Invention

This invention relates to the processing of data packets, composed of personal identifiers and personal data, such that the data may be considered anonymous. A system is described, that without user intervention, automatically maps the personal identifiers of data packets. Hence, the system allows two or more parties to exchange sensitive personal data seamlessly without having to expose the personal identity of the individuals which the data belongs to. The invention uses secret sharing to facilitate distributed key management of the mapping functions.

2. Description of Related Art

With modern days computers, analysis of large quantities of sensitive personal data is a common practice, for instance in epidemiological research and datamining of sales data. It is quite common that such research is carried out in a manner such that the data analyzers themselves are able to identify the individuals to which the personal data belongs. Either this is because the data packets identifiers are left as the personal identifiers themselves or because when the personal identifiers are mapped, the mapping is accessible to the data analyzer.

A typical example is where the mapping is done with a symmetric encryption (as in U.S. Pat. No. 3,962,539 to Ehrsam et al.) and the encryption key is known by the data analyzer. The reason often being the inconvenience imposed by the encryption process, if a special third party keyholder has to attend every data encryption session. Requiring encryption supervision from multiple parties becomes even more involved and the opposite is more common in practice, i.e. that knowledge of a single key is shared among several supervisors in order to ensure the availability of some supervisor in attending the encryption process.

SUMMARY OF THE INVENTION

The present invention is a software system for automatically mapping personal identifiers in data packets that contain personal data. The system is based on three main modules that operate in a secure environment. They are a secret sharing module, a mapping modules, and a communication module. The system is also connected to a persistent data storage.

The users roles are divided into four main categories; regular users, auditors, administrators and keyholders. Regular users are either senders or receivers or both, and are associated with different security zones or domains. Typically, there are only two security domains, i.e. data collectors and data analyzers, however, the system may be extended to have more than two security domains. Two-way authentication, using electronic certificates (such as U.S. Pat. No. 4,405,829 by Rivest et al.) is used whenever users log onto the system, hence, the system verifies each user and his role, and similarly the user confirms he is connected to the right system.

Once the system is up and running it may be thought of as a "black-box", with secure input-output channels for senders, receivers, supervisors, and its own persistent datastorage. Under the assumption that the system is running within a secure environment, e.g. secure operating system discussed by S. Castano et. al. in *Database Security*, Addison-Wesley Publishing Co., (1994) at pg. 218, or a tamper proof hardware, it is impossible to read or write any information stored in the system except through these secure channels. Hence, the system ensures that there is no illegal access by users without the required privileges. Similarly, all data transfers to the persistent data storage are either encrypted, digitally signed (such as by the method of Bruce Schneier in *Applied Cryptography*, John Wiley & Sons, Inc. (1996), page 483) or both, and therefore only modifiable and readable by the system itself. Therefore, the persistent data storage can be thought of as a part of a secure memory assigned to the system.

When the system is started for the first time, all the keyholders have to be present, the number of them being subject to specification during the startup. In this initial startup process, the system generates a secret encryption-key which will only be known to the system itself. This key, known as the data encryption key, is kept in the secure memory and is never revealed to anybody. However, it is stored persistently in an encrypted form using a secret sharing technique (such as that discussed by Schneier at page 528 in *Applied Cryptography*, cited above). Whenever the system needs to be restarted, a sufficient number of keyholders need to attend in order to decrypt the data encryption key. During the initial startup, a public-private key pair (as in U.S. Pat. No. 4,405,829 to Rivest et al.) is also generated for the system. The private-key is stored encrypted as the data encryption key and is used by the system to authenticate itself to its clients.

During the initial startup phase, supervisor roles have to be assigned to some users in addition to the keyholder roles. After that, all user operations may be carried out remotely. For instance, other users may be created remotely by the supervisors and their roles and electronic certificates registered with the system.

All data packets sent to the system are processed such that personal identifiers are mapped, e.g. encrypted. The system may either work in a push-push mode or push-pull mode. In the former case, the system automatically forwards the encrypted data to the receivers whereas in the latter case, the receiver has to request the data packets. Obviously, the system may also be used to decrypt data packets, therefore, the same user may act both as a receiver and as a sender.

The system may be configured to log user activity with different levels of details. For instance, the system may simply log the name of all the users involved in each transaction, but also, it may log all the content of the data transferred in the transaction. All such logs are saved in the persistent data storage, either encrypted or with digital signatures, such that tampering with logs is impossible without being detected by the system. In such instance, an auditor that monitors the logs is able to disable the system remotely, in order to stop its operation temporarily or to disable a specific user.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is an exemplary illustration of a file containing data packets with header, identifiers, and personal data.

FIG. 4 demonstrates exemplary setup of the information stored for the secret sharing module, i.e. the data structure of a secret-sharing envelope.

DETAILED DESCRIPTION OF THE PREFERRED EMBODIMENT

The following description of the preferred embodiment is to be understood as only one of many possible embodiments allowed by the scope of the present invention. Reference is made to the accompanying figures which form a part hereof.

Overview

Personal data frequently needs to be analyzed in large quantities, e.g. in epidemiological research, however, in most cases the true personal identity of the data records is not required. Nevertheless, it is a common practice to work with such data with personal identifiers since today there are no systems available that simplify the administrative task of making such data anonymous.

The current invention reveals a system for simplifying the process of making data anonymous. The system requires minimal user intervention and allows personal identifiers of data packets to be automatically mapped, such that two remote users, a data collector and data analyzer, may exchange data in an appropriate manner.

Setup

Figure 1:
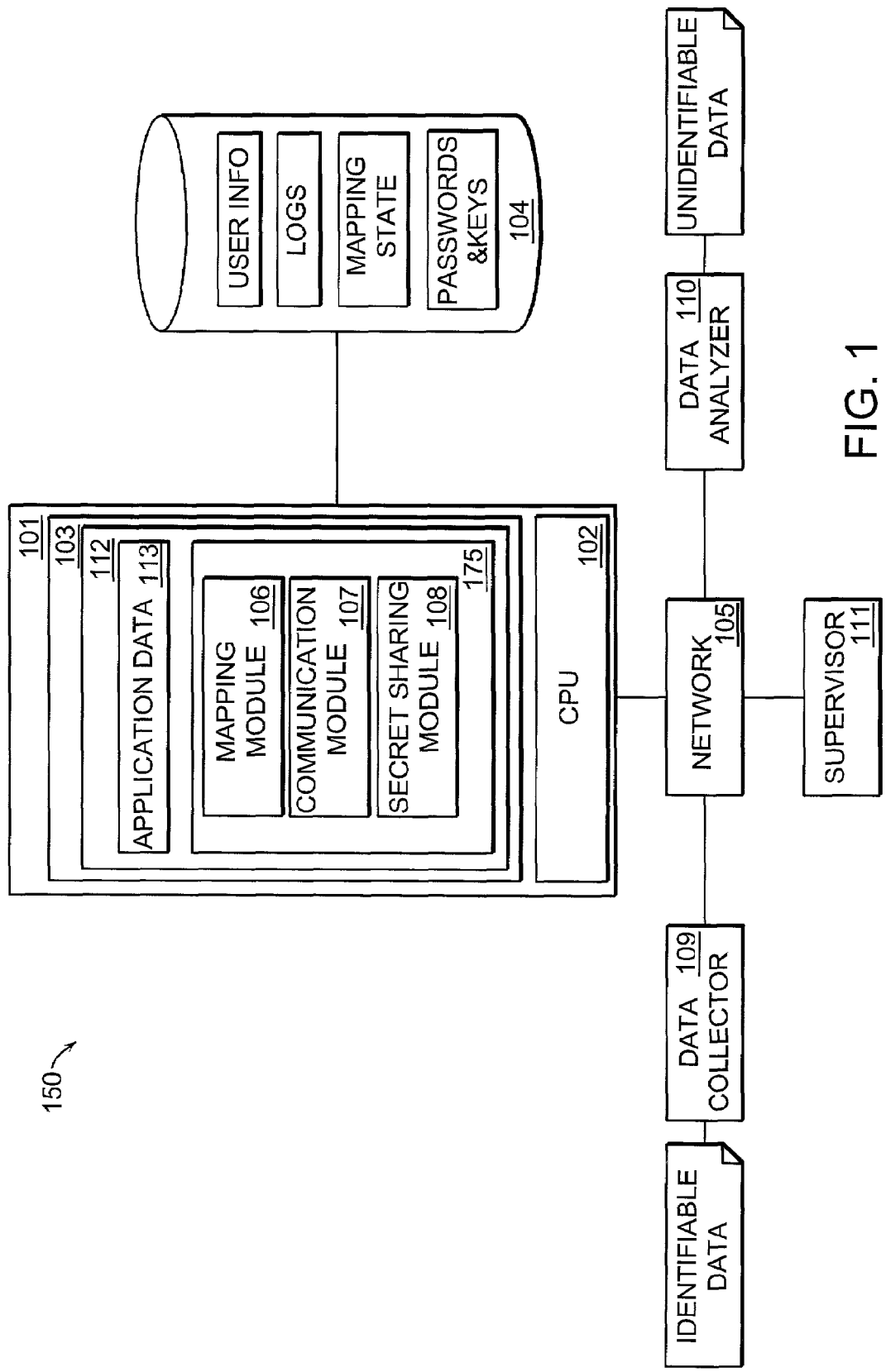
FIG. 1 is a block diagram illustrating an exemplary setup required to implement the preferred embodiment of the present invention.

FIG. 1 is a block diagram illustrating an example of a setup required to implement the preferred embodiment of the present invention with two security domains, e.g. one data collector 109 and one data analyzer 110. The figure shows the necessary components to setup the overall system 150, i.e. a computer 101, with a central processing unit 102 and a randomly accessible memory 103 for application programs and data, persistent data storage 104 and a wide area computer network 105 for connecting the system computer 101 together with its clients.

The heart of the invention system may be implemented as a computer program 175 running in a secure environment. This program 175 is made from three main components: a mapping module 106, a secure communication module 107, and a secret sharing module 108. Secure communication channels are established with a sender 109, a receiver 110, and a supervisor 111. Similarly, the system 150 may access a permanent storage 104 for storing system information outside the secure environment. The types of information stored by the system 150 may be divided into four categories: user information, data logs, mapping states, and secret sharing data.

In the preferred embodiment, the system is implemented as a software application 175 executing in a secure operating system with memory protection. Hence, the secure environment is the address space 112 reserved for the process that executes the system program. Within this address space 112 a symmetric data encryption key and an asymmetric private key are stored at 113 along with all other system data such as for the mapping module 106. These two keys never leave the secure address space 112 in an unencrypted format, hence they are only known to the invention software system 175 itself.

The permanent storage 104 is any device capable of storing digital information such as a hard disk or a magnetic tape. The invention software 175 uses encryption and digital signatures to ensure that data saved in the permanent storage area 104 cannot be read or tampered with unnoticed. No attempt is made however to prevent a "failure of service attacks" since the system 150 as a whole can always be destroyed.

Figure 2:
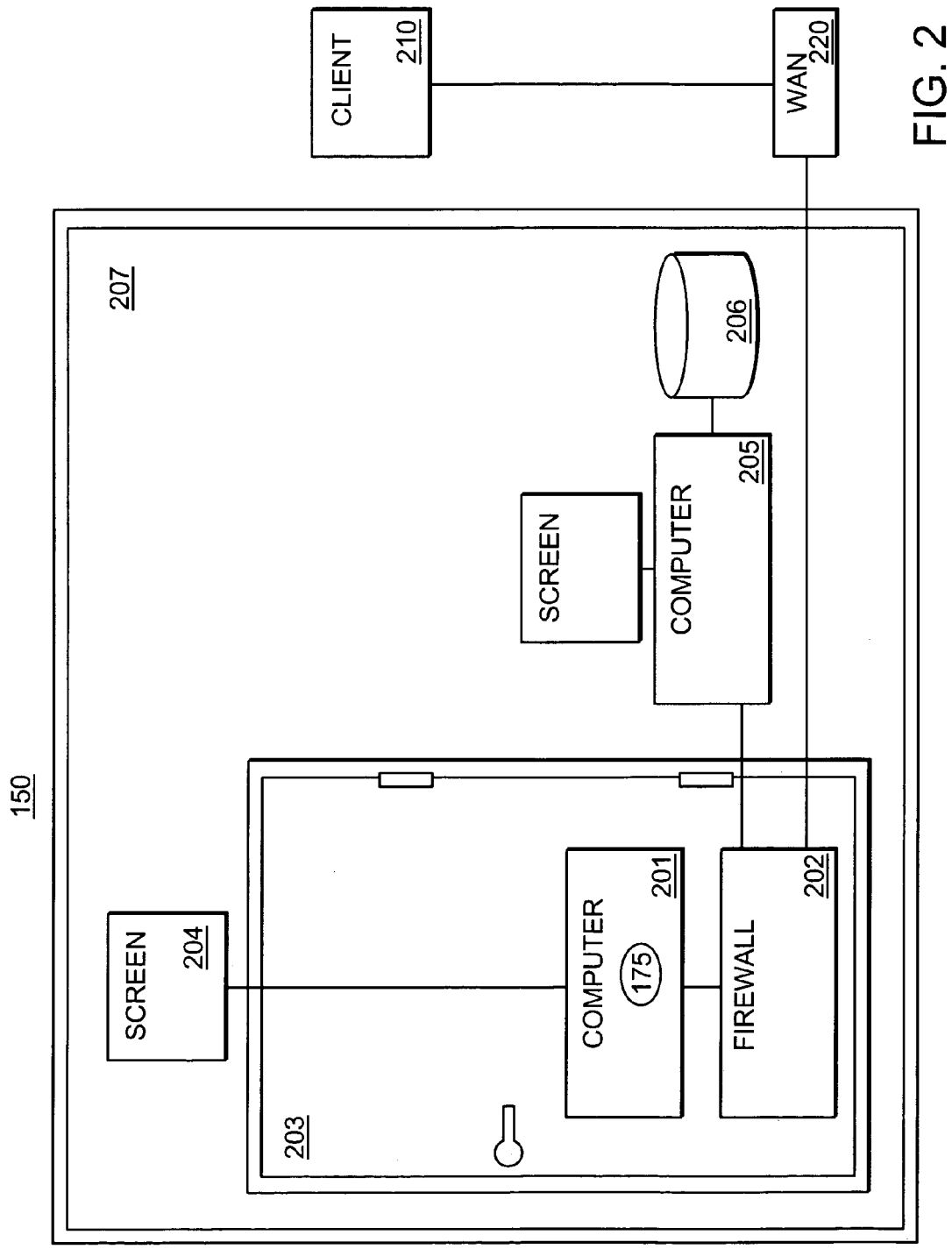
FIG. 2 depicts a secure setup of the present invention.

The system 150 may also be implemented with a tamper-proof hardware or any other setup where physical security is employed in order to protect the memory 103 used by the identity protection system 175. FIG. 2 depicts an example of such a setup built from generally available components, such as a regular computer 201 and a firewall 202 (such as described by S. Garfinkel et al. in *Practical Unix and Internet Security, 2nd ed.*, O'Reilly & Associates, Inc. (1996)) stored in a safe 203. The computer display monitor 204 is stored outside the safe 203 so that the systems 175 operation may be monitored, however, its keyboard is stored inside the safe 203. Through the firewall 202, the computer 201 in the safe is connected to a second computer 205 which controls a permanent storage 206, either a file server or a relational database server (e.g., as configured in R. Ramakrishnan and J. Gehrke in *Database Management Systems, 2nd ed.*, McGraw Hill (2000)). The storage computer 205 along with the safe 203 may be kept in a secure room 207 to which only the necessary individuals would be granted access, such as a system administrator for making backups of the permanent storage 206. Access to the safe 203 would however not be needed for such an operation and therefore the system 150 could be maintenanced without compromising the security of the invention identity protection system 175. Clients 210 such as data collectors and data analyzers would be connected to the encryption system 150 through a wide area network 220. Hence, in addition to a two-way communication between security computer 201 and storage computer 205, the firewall 202 would have to be configured to allow for a two-way communication on the wide area network 220.

General System Function

Referring to FIG. 3, the purpose of the invention system 175 is to automatically receive files 301 with a header 302, and multiple data packets 303, each consisting of personal identifiers 304 and personal data 305. The system 175 applies some specific mapping to the personal identifiers and then either stores the data in a log, until the appropriate receiver requests it, or forwards it directly to the appropriate receiver. Typically, the mapping function is a symmetric encryption, however, it may also be any other relation implemented as a table lookup or any combination of both. In both instances, all the information about the mapping, e.g. the encryption key or the lookup table, is stored in an encrypted format in the permanent data storage 104.

With the appropriate client application, a user 109 connects to the system 175 and establishes a secure connection with the system's communication module 107. Furthermore, the system server 101 authenticates the user and the user authenticates the system 175. A typical implementation of such two-way authentication and secure connection is the secure socket layer (SSL) described in U.S. Pat. No. 5,825,890 by Elgamal et al. for "Secure Socket Layer Application Program Apparatus and Method", however, other choices are also suitable. With the SSL approach, the system 175 stores the electronic certificates of all the registered users, i.e. the equivalent of their public keys (see U.S. Pat. No. 4,405,829 to Rivest et al.) The system 175 also keeps a private key (U.S. Pat. No. 4,405,829 to Rivest et al.), which it uses to prove itself to the users and the users have a local copy of the system's certificate. By using the SSL approach, one may ensure that all the communication of the system across the network, is only with known registered users.

Thus, it is possible to ensure that a sender may only send data to a registered and accepted receiver. Similarly, only users with appropriate roles may log onto the system as supervisors. This design allows all control of the system 175 to be carried out remotely, not only transmission and reception of data, but also all administrative tasks such as the creation of new users and inspection of logs. Hence, as long as the computer system 101 doesn't go down, the invention identity protection system 175 may be operated fully remotely. The mapping information and the data encryption key reside in the secure memory 112, never revealed to anybody but used by the system 175 to ensure a secret mapping of the personal identifiers.

When the invention system 175 works in a push-pull mode the following steps take place when a data collector 109 sends data to a data analyzer 110:

1. The data collector 109 user connects to the computer network system 150.
2. The invention software system 175 prompts the client for a username and loads the corresponding user information from the persistent data storage 104.
3. Using the user's digital certificate (public-key), the system 175 encrypts some data that the client 109 needs to decrypt with his private-key to proof himself to the system 175.
4. Similarly, the client 109 uses the published certificate of the system 175 to authenticate it, e.g. the system 175 uses its private key to decrypt data sent to it by the client 109 to authenticate itself to the client 109.
5. The user 109 selects a registered receiver 110 from a list of registered users which he is allowed to transfer data to.
6. The user 109 initiates the data transfer and the system 175 receives the data file 301.
7. The file 301 is saved encrypted with the data encryption key in the persistent storage 104 and necessary information about the transfer are written to the log.
8. The system 175 sends the receiver 110 an email to notify him about the data.
9. The user 109 logs off.

When the data analyzer (receiver) 110 retrieves the data, steps 1-4 above are repeated with client 110 in place of client 109. Then the following steps take place:

1. The user 110 selects the data file 301 to retrieve.
2. The mapping function is applied to all the identifiers of each data packet 303 in the data file 301.
3. The user client 110 receives the file 301 and stores it locally.
4. The receiver 110 logs off.

All other user cases have the same authentication pattern. Once the system 175 has accepted the user, he is only allowed to perform operations according to his role as specified in his user profile information.

Secret Sharing and Key Management

Turning now to FIG. 4, an important feature of the invention system 175 is to allow distributed responsibility of the mapping, by supporting multiple keyholders. Hence, the system 175 realizes a third-party encryption, where no single individual can compromise the secret mapping. Indeed, it may be specified how many keyholders are needed to compromise the key.

In the initial startup of the identity protection system 175, all of the participating keyholders have to attend, their number being subject to specification. For instance if N keyholders are required, the system 175 prompts for N passwords, one for each keyholder, and also their certificates. Each user is expected not to disclose his password outside of system 175. In the preferred embodiment, the system 175 concatenates all of these N passwords into a single combined password. Then, by applying a predefined message-digest function (as disclosed by Bruce Schneier in *Applied Cryptography*, (1996) page 435), MD( ), on the combined passwords an encryption key, K, is generated. That is, $K=MD(pw_1+pw_2+\ldots+pw_N)$. Here, $pw_1+pw_2$ denotes the concatenation of the two passwords, $pw_1$ and $pw_2$. The key K, referred to as the data encryption key, is unknown to any group of keyholders smaller than N, however, K is known to the system 175 during its operation.

The requirement for multiple keyholders introduces a certain type of management issue, i.e. all the keyholders may not be available for the lifetime of a particular project which relies on the system's 175 functionality. Hence, if the system 175 would have to be restarted for any reason, the sufficient number of keyholders might not be able to attend. Therefore, if an individual has to retire as a keyholder, it is useful enable that operation remotely without the involvement of all the keyholders. This is realized if the system 175 stores the passwords 401 of all the keyholders encrypted with K. System 175 replaces the password of the retiring keyholder with the new keyholder's password and likewise interchanges their certificates. Similarly, the same procedure may be used if a keyholder thinks his password has been compromised and wants to renew his password.

It is possible to configure the system 175 such that the total number of keyholders is larger than the number of keyholders needed to restart the system 175. As an example, assume that there are N keyholders, however, only M keyholders are required to restart the system 175, and therefore only M keyholders are required to disclose the mapping function. In the preferred embodiment, the system 175 stores the encrypted version of K for all combinations 402 of M passwords that exist. Standard combinatorial calculation shows that one needs $N!/(M!(N-M)!)$ versions of encryption keys for encrypting K. If M keyholders are available at restart, the system 175 may always form one of the encryption keys for decrypting K, by combining their M passwords. Similarly, since the system 175 knows all the passwords as well, it may always regenerate all these combinations if one keyholder changes his password, as in the scenario described above. Several other secret sharing techniques may also be applied to allow this functionality.

Unless otherwise stated, a common general pattern is used by the system 175 to encrypt plain-text data, i.e. CR(D,K), where CR( ) denotes the encryption algorithm, D the plain-text input data, and K the encryption key. (See above cited B. Schneier, *Applied Cryptography*, page 1.) The approach is to prefix the plain-text with a fixed length string that is a combination of a predefined verification pattern and a pseudo-random number. Furthermore, cipher-block chaining (Schneier, page 193) is used to propagate the randomness into all of the cipher-text. This makes it harder to observe patterns in the cipher-text and also makes it possible for the system to recognize if a cipher-text is decrypted into the correct plaintext, i.e. observe if either the encryption key is wrong or if the data has been tampered with.

When the system 175 is restarted, in case it went down due to some unspecified reason, the keyholders have to enter their passwords. The system 175 regenerates K, in the same manner as in the initial startup. If the verification pattern is incorrect, the system 175 knows that either some of the passwords are incorrect or that someone has tampered with the data. In order to allow the system 175 to draw a distinction between the two exceptions, the system 175 stores a message-digest 403 of each keyholder's password, a method used for standard password tables. This allows the system 175 to draw a distinction between the two exceptions and also to indicate which passwords are incorrect.

The data structures in 401-403 may be thought of as an envelope with a secret key, K, that may be opened only with the appropriate number of keyholders. As used herein, reference will be made to it as a secret-sharing envelope (SSE) 400.

Identifier Mapping

The main purpose of the invention system 175 is to convert personal identifiers in data packets 303 received from senders 109/110, using some kind of secret mapping, such that the original identifiers are not known to the receiver 110/109. As a result, the data in the data packets 303 when received are considered to be anonymous. Similarly, this scenario may be reversed, a sender sends anonymous data packets which are reverse mapped in order to provide a the receiver with identifiable data.

All mapping of the personal identifiers (PIDs) is handled by the mapping module 106 (FIG. 1). In a preferred embodiment, the mapping is either implemented using a symmetric encryption, a lookup table with a random generator, or a combination of both, i.e. some one-to-one mapping. Regardless of the mapping function, the mapping module 106 needs to save a persistent state, e.g. a PID-encryption key or a lookup table. Whatever the format of the information used by the mapping module 106, it may use the data encryption key, K, to encrypt the information.

When encryption is used for the mapping, it is optional whether the PID-encryption key is entered by key holders or if the system 175 generates it in the same manner as K. Most importantly, in its persistent state outside the mapping module 106, the PID-encryption key always needs to be stored encrypted.

Figure 5:
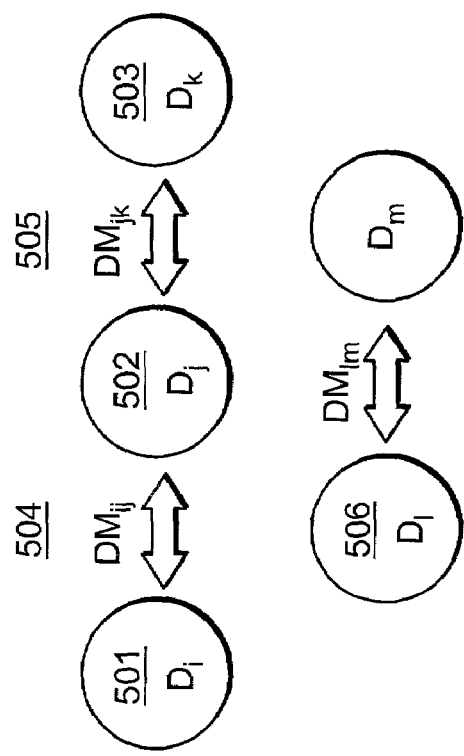
FIG. 5 illustrates mapping relations between the different security domains when the system is configured to work with more than two domains.

Further, the system 175 may also be configured to provide secret mapping between multiple domains. For instance, two domains might be the set of identifiers in two different laboratories working with anonymous data and the third domain the social-security identifiers. FIG. 5 illustrates three domains, $D_i$ 501, $D_j$ 502 and $D_k$ 503 that are related through two one-to-one mapping relations, $DM_{ij}$ 504 and $DM_{jk}$ 505. With these two mapping relations 504, 505, the system 175 is also able to provide a mapping between $D_i$ and $D_k$, e.g. $D_{ik}(x)=D_{jk}(D_{ij}(x))$, given the system is configurable to allow for such a mapping.

Similarly, the system 175 may allow for fully disparate sets with identifiers of different natures, e.g. $D_1$ 501 and $D_1$ 1506. As an example, it would be possible to have personal identifiers and identifiers of medical doctors in the same data record. These identifiers, belonging to two separate domains, are mapped simultaneously to two new domains with two independent mapping relations.

Figure 6:
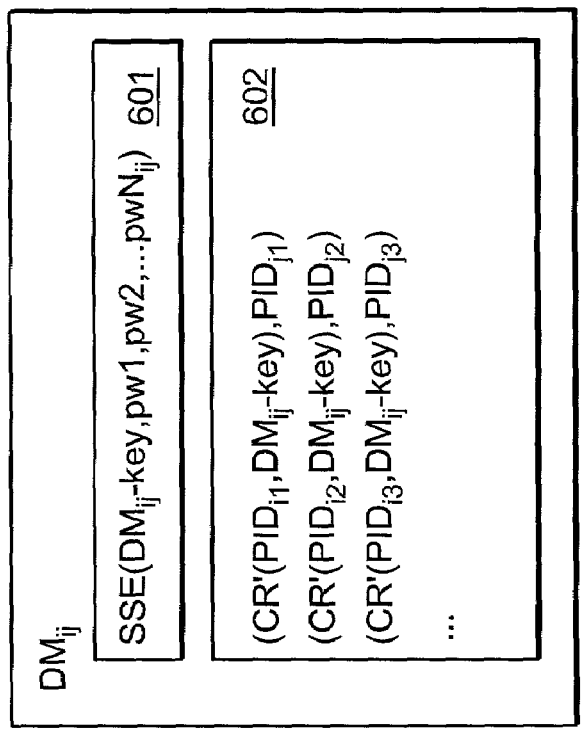
FIG. 6 shows a data structure for storing a mapping between two domains implemented using a secure lookup-table with secret-sharing access

In the case where the system 175 uses more than one mapping relation, it may be desirable to allow for separate secret-sharing access to each mapping relation, instead of using the data encryption key, K, as the mechanism to protect the mapping relation as mentioned above. Hence, each mapping relation would have its own secret-sharing envelope 400 (FIG. 4). FIG. 6 shows an example of the mapping information needed to store a lookup-table mapping relation. A secret-sharing envelope 601, SSE, is used to store a specific encryption key for the mapping, DM-key, and the lookup-table 602 is stored with one part of the relation encrypted. Here the encryption is denoted with CR'( ) to differentiate it from CR( ), described previously, since it is an encryption with no randomization. The format of look-up table 602 allows the system 175 to store a large lookup-table in a secure manner in a permanent storage 104. Furthermore, this allows for a fast lookup using database index (see Ramakrishnan et al., *Database Management Systems, 2nd Ed.*, (2000)) alleviating the need for storing the lookup-table in the secure address space 112 as would be needed if both parts of the relation in the lookup-table 602 were encrypted. In the example shown in 602, when an identifier is mapped from $D_i$ to $D_j$, the lookup is based upon the identifier encrypted with $DM_{ij}$-key. For the reverse mapping, however, the lookup is based on the identifier belonging to domain $D_j$ and the output then decrypted with $DM_{ij}$-key.

User Profiles and Data Logs

Figure 7:
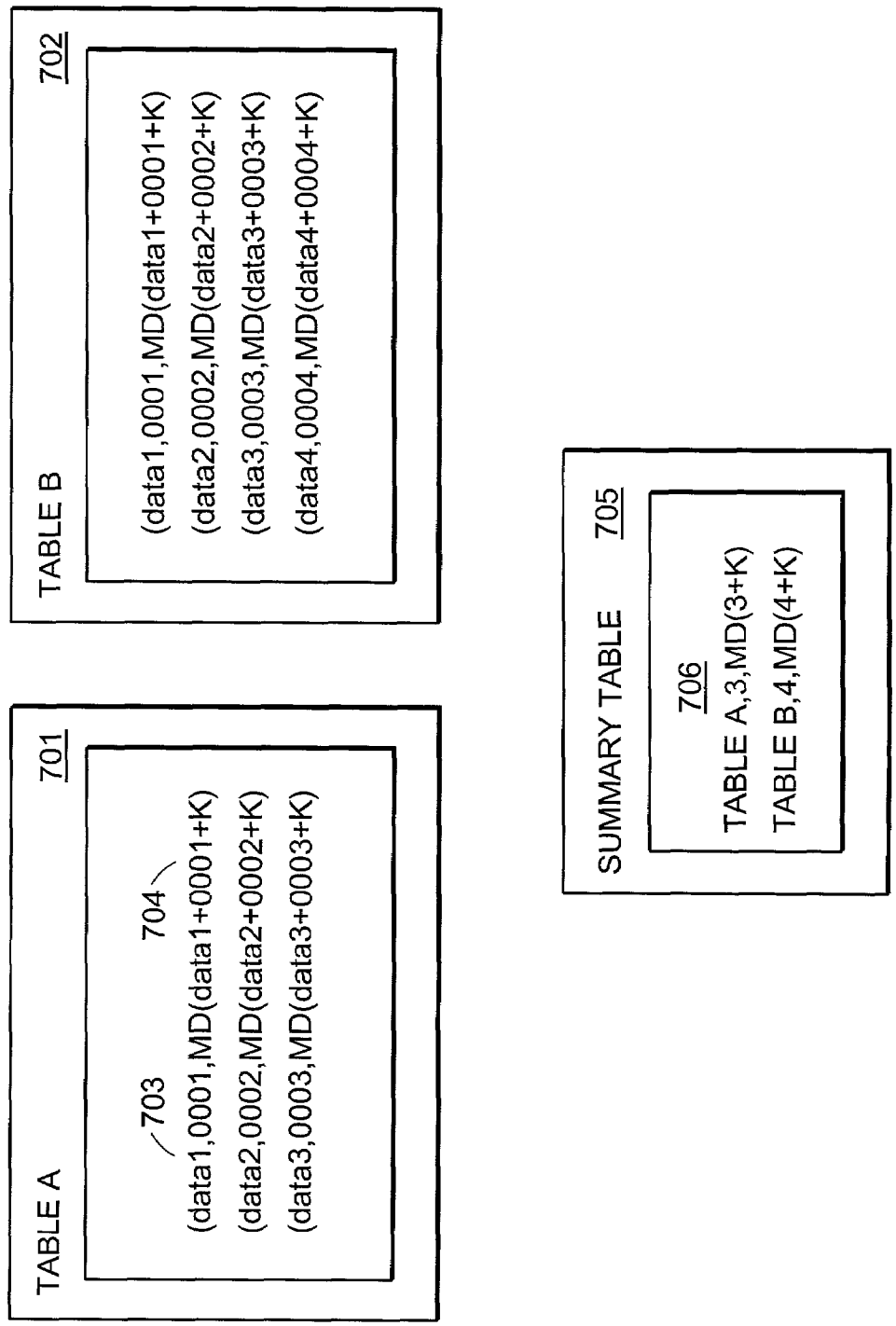
FIG. 7 is an illustration of a data tamper-proofing feature in one embodiment of the present invention.

The system 175 stores all information about users in the permanent storage 104. In a preferred embodiment of the permanent storage, a relational database is used with a structured query language (SQL) interface (as described in previously cited Ramakrishnan et. al., page 119). In order to be able to use the database query language, it is not practical to encrypt all information in the database. Also, information such as user profiles are rarely considered sensitive. However, the security of the system 175 may be compromised if it is possible to tamper with the user profile. To prevent this, some kind of digital signatures is employed. In particular, an extra column, containing an encrypted message digest of all the other columns is added to each data tuple in selected tables, e.g. CR(MD(tuple-data),K) or simply MD(tuple-data+K) where CR( ) and MD( ) are defined as in the above discussion. An example of this tamper proofing of stored data is shown in FIG. 7 and discussed below. The second possibility is to encrypt all the user data, however, this requires the system to load all the data into the secure memory in order to use it. The third option is to use combination of these two techniques.

In FIG. 7, table A 701 has three rows of data and table B has four rows of data depicted. To prevent illegal and unauthorized deletion of rows from tables A701 and B702, it is not sufficient to sign each independent row. For logs where rows are never supposed to be deleted or updated it is possible to use chaining, i.e. to let each row contain a message-digest of the previous row, however, this scheme is infeasible where rows need to be updated. A better scheme is to let the system 175 issue a row ID 703 to each record (row of data) in the tables 701, 702, and include it in the digital signature 704. A separate summary table 705 is then used, which stores the number of rows in each table 701, 702 utilized by the system 175. After inserting rows into a table 701, 702, the system 175 has to update the corresponding row in the summary table 705. Therefore, the system 175 is always able to verify the integrity of each table 701, 702 by checking if the counted number of rows in each table 701, 702 agrees with the corresponding number (count 706) stored in the summary table 705. Also, all records that are used from a table 701, 702 in a given SQL statement may be verified, using the digital signature of the corresponding rows. The summary table 705 is always relatively very small and therefore us easily stored in main memory, its backup is preferably stored in a secure datastore, such as inside a safe 203, or published regularly, such as when backups of datastore 206 are made.

If the system 175 is operated in a push-push mode, there is hardly any need to store the content of the file 301 with the data packets 303, since each transaction may be set up in such a way that the receiver 110 must have received all the data packets 303 before the sender 109 transaction completes. However, if the system 175 is operated in a push-pull mode, the receiver 110 and the sender 109 are no longer synchronized. The sender 109 may have completed the transaction to send all the data packets 303 before the receiver 110 requests this data. Therefore, the system 175 must store a temporary copy of the data packets 303. Since the content of the data packets 303 may contain sensitive data, the system 175 encrypts them before saving them to the persistent storage 104.

While this invention has been particularly shown and described with references to preferred embodiments thereof, it will be understood by those skilled in the art that various changes in form and details may be made therein without departing from the scope of the invention encompassed by the appended claims.

What is claimed is:

1. In a computer network, apparatus for mapping data between different security domains, the apparatus comprising:
   a communication module stored on a computer-readable medium, the communication module establishing a communication connection between a sender of one security domain and a receiver in a different security domain, wherein the communication connection is a secure communication channel formed by the communication module (i) authenticating the sender with the communication module and authenticating the receiver with the communication module, resulting in an authorized sender and authorized receiver, and (ii) encrypting working data transmitted over the channel;
   a mapping module stored on a computer-readable medium coupled to the communication module, the mapping module anonymously mapping working data of the one security domain to working data of the different security domain, the working data having (i) a research data portion and (ii) a personal identifier portion related to identifying a person associated with the research data portion, the mapping module mapping the personal identifier portion of the working data in the one security domain to the personal identifier portion of the working data in the different security domain such that the working data transmitted to the receiver over the secure communication channel is anonymous data, while leaving the research data portion unmapped by the anonymous mapping of the personal identifier portions; and
   a secret sharing module stored on a computer-readable medium, the secret sharing module performing secret sharing to control keyholder access to the mapping module such that a predetermined number of keyholders greater than one is required to compromise access to the mapping module;
   the apparatus communicating between parties comprising at least the sender and the receiver in at least two different security domains;
   wherein the communication module (i) transmits both the anonymously mapped personal identifier portion and the unmapped research data portion of the working data to the receiver over the secure communication channel, and (ii) transmits from the receiver to the sender a return of the working data based on a reverse mapping performed by the mapping module;
   and wherein the anonymous mapping of the personal identifier portion is a one-to-one mapping.

2. Apparatus as claimed in claim 1 wherein the research data portion of the working data includes personal data of individuals.

3. Apparatus as claimed in claim 1 wherein the mapping module employs encryption in the mapping of the personal identifier portion of the working data in the one security domain to the personal identifier portion of the working data in the different security domain such that the working data transmitted to the authorized receiver is anonymous data.

4. Apparatus as claimed in claim 1 further comprising permanent storage means for storing data in a tamper-proof manner.

5. Apparatus as claimed in claim 4 wherein the permanent storage means encrypts non-queried parts of the data, said encryption using an encryption key, and the secret sharing module storing the encryption key.

6. Apparatus as claimed in claim 5 wherein the permanent storage means employs digital signatures on queried parts of the data to detect changes in data and thereby prevent tampering.

7. Apparatus as claimed in claim 6 wherein each digital signature is formed from a message digest of a concatenation of the encryption key and data.

8. Apparatus as claimed in claim 6 wherein the permanent storage means maintains a summary measure of stored data.

9. Apparatus as claimed in claim 8 wherein said summary measure has a respective digital signature.

10. Apparatus as claimed in claim 1 wherein the mapping module defines a mapping between any two security domains by storing a mapping table having cross references between personal identifier portions of working data of the two security domains.

11. Apparatus as claimed in claim 10 wherein the mapping module stores a mapping table for plural security domains, the mapping table being formed of (i) an index section and (ii) a working reference section, the index section indicating a personal identifier portion of working data in a first security domain and the working reference section indicating a corresponding personal identifier portion in a second security domain, the working reference being encrypted, such that the mapping module performs decryption on a part of the mapping table to determine a usable cross reference of the working data.

12. Apparatus as claimed in claim 1 wherein the mapping module maps working data among plural security domains.

13. Apparatus as claimed in claim 1 wherein the sender and receiver are respectively one of a software implementation and a human being.

14. Apparatus as claimed in claim 1 wherein connection of the sender and receiver is in respective different sessions.

15. Apparatus as claimed in claim 1 wherein the communication module further enables communication connection by a supervisor in addition to the sender and receiver.

16. Apparatus as claimed in claim 15 wherein the communication connection by the supervisor enables remote operation of the apparatus by the supervisor.

17. A method for transferring and mapping data between different security domains in a computer network, comprising the steps of:
   using a communication module stored in a computer-readable medium, establishing a communication connection between a sender in one security domain and a receiver in a different security domain, wherein the communication connection is a secure communication channel formed by the communication module (i) authenticating the sender with the communication module and authenticating the receiver with the communication module, resulting in an authorized sender and authorized receiver, and (ii) encrypting working data transmitted over the channel;

using the communication module, transmitting working data from the authorized sender to the authorized receiver, the working data having (i) a research data portion and (ii) a personal identifier portion related to identifying a person associated with the research data portion;

using a mapping module stored in a computer-readable medium, anonymously mapping the working data of the one security domain to working data of the different security domain by mapping between the personal identifier portion of the working data in the one security domain and the personal identifier portion of the working data in the different security domain, the mapping between the personal identifier portions being performed such that the working data received by the receiver over the secure communication channel is anonymous data, while leaving the research data portion unmapped by the anonymous mapping of the personal identifier portions;

using a secret-sharing module stored in a computer-readable medium, controlling keyholder access to the mapping using secret sharing such that a predetermined number of keyholders greater than one is required to compromise access to the mapping module; and transmitting from the receiver to the sender a return of the working data based on a reverse mapping performed by the mapping module;

wherein transmitting the working data from the sender to the receiver using the communication module comprises transmitting both the anonymously mapped personal identifier portion and the unmapped research data portion of the working data to the receiver over the secure communication channel; and wherein the anonymous mapping of the personal identifier portion is a one-to-one mapping.

18. A method as claimed in claim 17 wherein the step of transmitting includes including personal data of individuals in the research data portion.

19. A method as claimed in claim 17 wherein the step of mapping the personal identifier portions includes encrypting such that the working data received by the authorized receiver is anonymous data.

20. A method as claimed in claim 17 further comprising the step of storing data in a tamper-proof manner in a permanent storage.

21. A method as claimed in claim 20 wherein the step of storing includes encrypting non-queried parts of the data.

22. A method as claimed in claim 21 wherein the step of storing further includes assigning a respective digital signature to each queried part of the data to enable detection of changes in the data and thereby prevent tampering.

23. A method as claimed in claim 22 wherein the step of encrypting employs an encryption key, and the step of assigning includes forming a digital signature from a message digest of a concatenation of data and the encryption key.

24. A method as claimed in claim 22 wherein the step of storing working data includes maintaining a summary measure of stored data.

25. A method as claimed in claim 24 wherein the step of maintaining a summary measure includes assigning a digital signature to the summary measure.

26. A method as claimed in claim 17 wherein the step of mapping includes storing a mapping table having cross references between the personal identifier portions of the working data of the two security domains.

27. A method as claimed in claim 26 wherein the step of storing a mapping table includes storing a respective mapping table for each security domain, each mapping table being formed of (i) an index section and (ii) a working reference section, the index section indicating a personal identifier portion of working data in a first security domain and the working reference section indicating a corresponding personal identifier portion in a second security domain, the working reference being encrypted; and decrypting a part of the mapping table to determine a usable cross reference of the working data.

28. A method as claimed in claim 17 wherein the step of mapping includes mapping working data among plural security domains.

29. A method as claimed in claim 17 wherein the sender and receiver are respectively one of a software implementation and a human being.

30. A method as claimed in claim 17 wherein the step of establishing a communication connection between the sender and receiver includes connecting the sender in one session and connecting the receiver in a different session.

31. A method as claimed in claim 17 further comprising the step of connecting a supervisor to the computer network.

32. A method as claimed in claim 31 further comprising the step of enabling remote control by the supervisor.

33. Apparatus as claimed in claim 1 wherein the personal identifier portion of the working data includes personal identifiers from plural security domains, the mapping module mapping multiple personal identifiers between multiple security domains for each research portion of the working data.

34. Apparatus as claimed in claim 1 further comprising:
a secured container;
a computer system executing the communication module and the mapping module; and
a firewall coupled to the computer system, the computer system and firewall being housed by the secured container so as to provide tamper-proof hardware.

35. An apparatus according to claim 1, wherein the working data is formed of plural records, each record comprising (i) a research data portion and (ii) a personal identifier portion related to identifying an individual person associated with the research data portion, the individual person being the same person across each record of the plural records.

36. A method according to claim 17, wherein the working data is formed of plural records, each record comprising (i) a research data portion and (ii) a personal identifier portion related to identifying an individual person associated with the research data portion, the individual person being the same person across each record of the plural records.

* * * * *